United States Patent
Ito et al.

[11] Patent Number: 5,439,993
[45] Date of Patent: Aug. 8, 1995

[54] PROCESS FOR THE PRODUCTION OF HIGHLY WATER ABSORPTIVE POLYMERS

[75] Inventors: Kiichi Ito; Shinji Tsunoi; Tetsuya Yamamoto, all of Yokkaichi, Japan

[73] Assignee: Mitsubishi Petrochemical Co., Ltd., Tokyo, Japan

[21] Appl. No.: 220,931

[22] Filed: Mar. 31, 1994

Related U.S. Application Data

[63] Continuation of Ser. No. 899,985, Jun. 17, 1992, abandoned.

[30] Foreign Application Priority Data

Jun. 20, 1991 [JP] Japan .................................. 3-148857

[51] Int. Cl.$^6$ .............................................. C08F 2/12
[52] U.S. Cl. ....................................... 526/93; 526/91; 526/240; 526/241; 526/306; 526/313.1
[58] Field of Search ................... 526/91, 93, 240, 241, 526/306, 317.1

[56] References Cited

U.S. PATENT DOCUMENTS

| | | | |
|---|---|---|---|
| 2,683,140 | 7/1954 | Howard | 526/91 |
| 2,789,099 | 4/1957 | Rife et al. | |
| 4,090,013 | 5/1978 | Ganslaw et al. | 526/240 X |
| 4,145,495 | 3/1979 | Robinson et al. | |
| 4,314,044 | 2/1982 | Hughes et al. | 526/91 X |
| 4,659,793 | 4/1987 | Yang | 526/91 |
| 5,086,133 | 2/1992 | Itoh et al. | 526/93 |
| 5,100,980 | 3/1992 | Hughes et al. | 526/91 |

FOREIGN PATENT DOCUMENTS

| | | |
|---|---|---|
| 0183466 | 6/1986 | European Pat. Off. . |
| 3031306 | 2/1991 | Japan . |

*Primary Examiner*—Mark Nagumo
*Attorney, Agent, or Firm*—Armstrong, Westerman, Hattori, McLeland & Naughton

[57] ABSTRACT

A process for producing a highly water absorptive polymer, including the step of polymerizing an acrylic monomer including as the main component acrylic acid and/or an alkali metal salt thereof in the presence of a salt of a metal selected from the group consisting of Fe(II), Fe(III), Cu(II), Mn(II), VO(II), Co(II) and Ni(II).

4 Claims, 1 Drawing Sheet

PROCESS FOR THE PRODUCTION OF HIGHLY WATER ABSORPTIVE POLYMERS

This application is a continuation of application Ser. No. 07/899,985 filed Jun. 17, 1992, now abandoned

BACKGROUND OF THE INVENTION

1. Field of the Invention

This invention relates to a process for producing highly water absorptive polymers.

The polymers obtained by the process of this invention are highly absorptive not only to pure water but also to various electrolytic aqueous solutions such as a physiological saline solution and artificial urine. Moreover, they can absorb water very quickly and the resulting gelled polymers exhibit a high strength. Therefore, the highly water absorptive polymers obtained by the process according to the present invention are advantageously used for various absorbent materials, in particular, in the field of sanitary goods.

2. Background Art

In recent years, highly water absorptive polymers are practically used not only for sanitary goods such as sanitary napkins and paper diapers but also for materials to be used in industrial fields as well as in horticultural and agricultural fields, such as water holding materials, dropwise condensation preventing materials, freshness preserving materials and dehydrating materials. It is expected that the application of highly water absorptive polymers will broaden in the future.

Conventionally known highly water absorptive polymers are a hydrolyzate of a graft copolymer of starch and acrylonitrile, a crosslinked product of carboxymethyl cellulose, a crosslinked product of polyacrylic acid (salt), a copolymer of acrylic acid (salt) and vinyl alcohol, a crosslinked product of polyethylene oxide, and the like.

A highly water absorptive polymer is required to have a high water absorption capacity and to exhibit a high water absorption rate when it is brought into contact with an aqueous liquid. These properties are especially important to sanitary goods such as sanitary napkins and paper diapers, which have rapidly spread recently and are produced by rapidly-advancing techniques. However, none of the above-described conventional highly water absorptive polymers can satisfactorily meet the above requirements.

In general, the water absorption capacity of a highly water absorptive polymer is incompatible with the water absorption rate and the strength of the gelled polymer (hereinafter referred to simply as the gel strength); that is, both the water absorption rate and the gel strength of a highly water absorptive polymer decrease as its water absorption capacity is made higher. Therefore, how to harmonize these conflicting properties has been a most serious problem in the art. In particular, when an acrylic monomer as used in the present invention is employed as a starting material, the monomer itself tends to cause crosslinking (so-called self-crosslinking) during polymerization even in the absence of a crosslinking agent if a persulfate such as ammonium persulfate or potassium persulfate is used as an initiator. The self-crosslinking of an acrylic monomer generally provides a polymer which has a sufficiently high water absorption rate and gel strength, but has an insufficient water absorption capacity.

The self-crosslinking of the monomer may be suppressed, for example, by remarkably decreasing the monomer concentration, or by using an azo compound as a polymerization initiator, such as the aqueous solution polymerization method disclosed in Japanese Patent Kokai Publication No. 58-71907 and the surface treating method disclosed in Japanese Patent Kokai Publication No. 59-62665. However, the former method is not practical because its production efficiency is extremely low, and the latter method using an azo initiator is also unsatisfactory so far as the present inventors know.

It is, therefore, a primary object of the present invention to provide a process for producing, with high efficiency, a highly water absorptive acrylic polymer which has a remarkably enhanced water absorption capacity while having a high water absorption rate and a high gel strength.

SUMMARY OF THE INVENTION

It has now been found that a highly water absorptive polymer which is much more absorptive to pure water and also to various electrolytic aqueous solutions than the conventional highly water absorptive polymers can be obtained by polymerizing an acrylic monomer in the presence of a salt of a metal selected from Fe(II), Fe(III), Cu(II), Mn(II), VO(II), Co(Ii) and Ni(II). It has also been found that by modifying the surface of the above polymer with a specific silane compound, the resulting polymer shows a higher water absorption rate and has a remarkably enhanced gel strength without substantially deteriorating its excellent water absorption capacity. The present invention has been accomplished on the basis of the above findings.

Thus, the present invention provides a process for producing a highly water absorptive polymer, comprising the step of polymerizing an acrylic monomer comprising as the main component acrylic acid and/or an alkali metal salt thereof in the presence of a salt of a metal selected from the group consisting of Fe(II), Fe(III), Cu(II), Mn(II), VO(II), Co(II) and Ni(II).

The present invention further provides a process for producing a highly water absorptive polymer, comprising the steps of polymerizing an acrylic monomer comprising as the main component acrylic acid and/or an alkali metal salt thereof in the presence of a salt of a metal selected from the group consisting of Fe(II), Fe(III), Cu(II), Mn(II), VO(II), Co(II) and Ni(II) to obtain a granular highly water absorptive polymer, and treating the granular polymer with a silane compound having the following formula in the presence of water to modify the surface of the polymer:

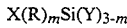

$$X(R)_m Si(Y)_{3-m}$$

where X is a functional group which can be reacted with the carboxyl group and/or the carboxylate group contained in the highly water absorptive polymer, R is a hydrocarbon radical, Y is a hydrolyzable group, and m is an integer of 0, 1 or 2.

According to the present invention, a highly water absorptive polymer which shows a very high absorbing capacity not only for pure water but also for various electrolytic aqueous solutions can be obtained. Further, by modifying the surface of the polymer with a specific silane compound, both the water absorption rate and the gel strength of the polymer can be remarkably improved without substantially deteriorating its excellent water absorption capacity.

Thanks to such advantageous properties, the highly water absorptive polymers obtained by the process of the invention can be favorably used not only for materials used in horticultural and agricultural fields such as soil conditioners and water retaining agents but also for sanitary goods such as sanitary napkins and paper diapers.

DETAILED DESCRIPTION OF THE INVENTION

<Acrylic Monomer>

Figure 1:
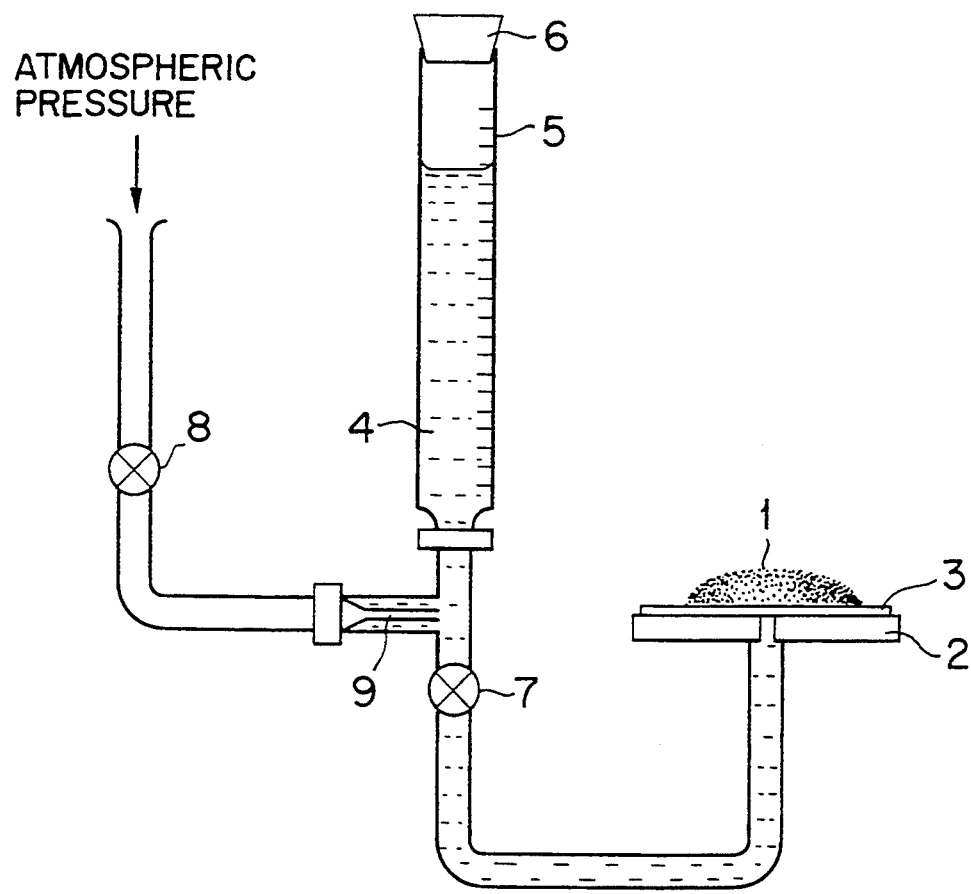
FIG. 1 is a schematic view of an apparatus used to measure the water absorption rate of the highly water absorptive polymers obtained in Examples and Comparative Examples.

The acrylic monomer for use in the present invention comprises as the main component acrylic acid and/or an alkali metal salt thereof. The wording "as the main component" herein means that the acrylic monomer comprises 80% by weight or more of acrylic acid and/or an alkali metal salt thereof. The main component of the acrylic monomer should preferably be a partially neutralized salt of acrylic acid in which 20 mol % or more, preferably 50 mol % or more of the total carboxyl groups are neutralized into the alkali metal salt. When the degree of neutralization is less than 20 mol %, the finally obtainable polymer will be poor in both the water absorption capacity and the gel strength. The upper limit of the degree of neutralization may be approximately 90 mol %. The alkali metal salt herein refers to a salt obtained by neutralizing the carboxyl groups contained in acrylic acid with an alkali metal hydroxide such as sodium hydroxide, potassium hydroxide or lithium hydroxide. A salt obtained by neutralizing acrylic acid with sodium hydroxide is particularly preferred when the properties of the finally obtainable highly water absorptive polymer and the production cost are taken into consideration.

The acrylic monomer may further comprise as a minor component other monomer(s) copolymerizable with the main component, such as methacrylic acid (salt), itaconic acid (salt), acrylamide, 2-acrylamide-2-methylpropanesulfonic acid (salt), 2-(meth)acryloylethanesulfonic acid (salt) and 2-hydroxyethyl(meth)acrylate. The term "(meth)acryloyl" herein refers to both acryloyl and methacryloyl, and the term "(meth)acrylate" refers to both acrylate and methacrylate.

The acrylic monomer may also comprise a crosslinking agent. A water-soluble compound which contains in its molecule two or more polymerizable unsaturated groups and which is-copolymerizable with the acrylic acid (salt) as the main component is generally used as the crosslinking agent. Preferred examples may include bisacrylamides such as N,N'-methylenebisacrylamide and N,N'-methylenebismethacrylamide, and long-chain diacrylates such as ethylene glycol di(meth)acrylate and polyethylene glycol di(meth)acrylate. The suitable amount of the crosslinking agent used is about 0.001 to 0.5% by weight, preferably 0.005 to 0.3% by weight based on the aqueous monomer solution.

<Radical Polymerization Initiator>

A radical polymerization initiator is generally used in the process of the present invention, and a water soluble one is preferred. Preferred examples of the water soluble initiators include peroxides such as hydrogen peroxide, persulfates such as potassium persulfate and ammonium persulfate, hydroperoxides such as cumene hydroperoxide, azo compounds such as 2,2'-azobis-(2-amidinopropane)hydrochloride. It is possible to use two or more of the above aqueous radical initiators in combination. Furthermore, a redox-type initiator consisting of the combination of the peroxide and a reducing compound such as a sulfite or an amine can also be used as the polymerization initiator. The suitable amount of the polymerization initiator used is, in general, approximately 0.001 to 5.0% by weight, preferably 0.01 to 1.0% by weight based on the aqueous monomer solution.

<Metallic salt>

The first process for producing highly water absorptive polymers according to the present invention is characterized in that the acrylic monomer is polymerized in the presence of a metallic salt.

The metallic salt to be used in the present invention is a salt of a metal selected from the group consisting of Fe(II), Fe(III), Cu(II), Mn(II), VO(II), Co(II) and Ni(II). Specifically, salts, preferably water-soluble salts, in which the above metals exist as cations, for instance, halides, sulfates, nitrates, acetates, phosphates, citrates and oxalates are employed in the present invention. Specific examples of such metallic salts include (a) iron(III) chloride, iron(III) acetate, iron(III) phosphate, iron(III) sulfate, iron(III) nitrate and iron(III) citrate; (b) iron(II) chloride, iron(II) lactate, iron(II) oxalate, iron(II) sulfate and iron(II) sulfide; (c) copper(II) chloride, copper(II) bromide, copper(II) sulfate, copper(II) nitrate and copper(II) acetate; (d) manganese(II) chloride, manganese(II) bromide, manganese(II) nitrate and manganese(II) sulfate; (e) vanadyl(II) sulfate and vanadyl(II) oxalate; (f) cobalt(II) chloride, cobalt(II) acetate, ammonium cobalt(II) sulfate, cobalt(II) nitrate and cobalt(II) phosphate; and (g) nickel(II) chloride, nickel(II) sulfate, nickel(II) nitrate and nickel(II) acetate. Some of these salts exist as hydrates. Such hydrates are also usable in the process of the present invention. Moreover, oxychlorides of the metals are also preferably employed.

Of the above enumerated metallic salts, iron(III) salts, copper(II) salts and vanadyl(II) salts are particularly preferred.

The metals of the above metallic salts each have a plurality of valences. Some of the salts containing metals with a small number of valences are known as compounds which act as reducing components on a peroxide polymerization initiator to form a redox system. For instance, the so-called Fenton reagent which is composed of a combination of ferrous chloride and hydrogen peroxide is known as a typical example of redox initiators.

However, the effect produced by the use of the metallic salt according to the present invention is not considered to be due to the formation of redox system. This is apparent from the fact that salts of Fe(III), Cu(II) and VO(II) which have a large number of valences or hardly participate in oxidation-reduction reactions are preferably used in the process of the invention.

<Silane Compound>

The second process for producing highly water absorptive polymers according to the present invention is characterized in that the above-mentioned acrylic monomer is polymerized in the presence of the above-mentioned metallic salt and in that the resulting highly water absorptive polymer is treated with a silane compound to modify the surface thereof.

The silane compound for use in the above process of the invention is a compound having the following formula (I):

  (I)

where X is a functional group which can be reacted with the carboxyl group and/or the carboxylate group contained in the highly water absorptive polymer, R is a hydrocarbon radical, Y is a hydrolyzable group, and m is an integer of 0, 1 or 2.

Examples of the functional group X include organic groups having a glycidyl group, an amino group, a mercapto group or the like. Examples of the hydrocarbon radical R include lower alkyl groups such as a methyl group and an ethyl group. Examples of the hydrolyzable group Y include an alkoxyl group and an acetoxyl group.

Therefore, examples of the silane compound having the formula (I) include

γ-glycidoxypropyltrimethoxysilane,
γ-glycidoxypropylmethyldimethoxysilane,
β-(3,4-epoxycyclohexyl)ethyltrimethoxysilane,
γ-(2-aminoethyl)aminopropyltrimethoxysilane,
γ-(2-aminoethyl)aminopropylmethyldimethoxysilane,
γ-aminopropyltriethoxysilane,
N-phenyl-γ-aminopropyltrimethoxysilane,
γ-mercaptopropyltrimethoxysilane,
γ-mercaptopropylmethyldimethoxysilane,
γ-chloropropyltrimethoxysilane,
γ-chloropropylmethyldimethoxysilane and octadecyldimethyl[3-(trimethoxysilyl)propyl]ammonium chloride.

The amount of the silane compound used varies depending on the type of the highly water absorptive polymer to be treated and the amount of water existing in the polymer. However, it is, in general, 0.001 to 10% by weight, preferably 0.01 to 3% by weight based on the highly water absorptive polymer. When the amount of the silane compound used is too small, improvements in the water absorption rate and the gel strength cannot be achieved; while when the amount is too large, the resulting polymer will have a low water absorption capacity.

In the present invention, a compound which is generally known as a silanol condensation catalyst, such as dibutyltin dilaurate, dibutyltin diacetate or dibutyltin dioctoate, may be used along with the silane compound. A highly water absorptive polymer imparted with an effectively controlled water absorption rate may be obtained by a treatment using both the silane compound and the silanol condensation catalyst.

The amount of the silanol condensation catalyst used may be, in general, 0.1 to 500% by weight, preferably 1 to 100% by weight based on the silane compound.

<Polymerization>

In the present invention, any known method for polymerizing an acrylic monomer to produce a highly water absorptive polymer may be employed. Usually, however, the polymerization of the acrylic monomer is effected by a reverse-phase suspension polymerization method in which an aqueous monomer solution is suspended in a hydrocarbon solvent and polymerized in the presence or absence of a surfactant, or by an aqueous solution polymerization method in which an aqueous monomer solution itself is polymerized. Of these two methods, the reverse-phase suspension polymerization method is preferred because water used for preparing the aqueous monomer solution can be easily removed if this method is adopted. A highly water absorptive polymer is obtained in a granular state when the reverse-phase suspension polymerization method is employed. In this case, the average particle size of the polymer granules is generally about 50 to 200 μm.

It is preferred that the concentration of the acrylic monomer in the aqueous monomer solution be 20 to 80% by weight, particularly 30 to 60% by weight.

In either polymerization method, the above-mentioned metallic salt is usually added to the aqueous acrylic monomer solution when it is prepared. The amount of the metallic salt added varies depending on the monomer concentration and the degree of neutralization. However, it is, in general, 0.0001 to 3% by weight, preferably 0.001 to 1% by weight based on the acrylic monomer.

<Modification of Polymer Surface>

Modification of the surface of a highly water absorptive polymer can be carried out when the polymer has an effectively modifiable surface. A granular state obtainable, for example, by the reverse-phase suspension polymerization method is a typical one suitable for the modification.

In a preferred embodiment of the present invention, after the polymerization is completed, the resulting polymer is successively treated with the above-mentioned silane compound to modify the surface thereof. In this treatment, the water content of the polymer should be adjusted to, in general, 1 to 100% by weight, preferably 10 to 50% by weight. The treatment may be carried out by directly adding the silane compound to the polymer, or by adding the silane compound to a slurry which is a mixture of the polymer and an inert solvent such as a hydrophobic solvent, for instance, n-hexane, cyclohexane or n-heptane, or a hydrophilic solvent, for instance, methanol, ethanol or acetone. Further, as mentioned previously, when dibutyltin dilaurate, dibutyltin diacetate or dibutyltin dioctoate, which is generally known as a silanol condensation catalyst, is used along with the silane compound, the modification may be carried out more effectively. The amount of the silanol condensation catalyst used may be, in general, 0.1 to 500% by weight, preferably 1 to 100% by weight based on the silane compound.

The suitable temperature for the modification of polymer with the silane compound in the presence of water varies depending on the type of the silane compound used, the amount of the silanol condensation catalyst, the type and amount of the inert solvent, the amount of water and the type of the highly water absorptive polymer. However, the modification is carried out at a temperature generally in the range of 20° to 180° C., preferably 50 to 150° C.

The time for treating the polymer with the silane compound is also not particularly limited. However, in general, it ranges from 0.5 to 6 hours.

The treatment of the polymer with the silane compound may be completed by maintaining the system at a high temperature, for example, 100° C., or more, or by removing water from the system by evaporation.

The polymer treated with the silane compound can be used as a highly water absorptive polymer as it is, or after removing the water and, if necessary, washing with an inert solvent.

The present invention will now be explained more specifically referring to the following examples. In the examples, the properties of the highly water absorptive polymers obtained were measured in accordance with the following manners.

<Water Absorption Capacity>

(1) Pure water absorption:

Accurately weigh approximately 0.2 g of a highly water absorptive polymer. Place the polymer in 1000 cc of pure water. Stir the mixture by a magnetic stirrer for one hour to get the polymer swollen with the water. Place the swollen polymer on a 100-mesh filter for 15 minutes for draining. Weigh the swollen gel thus obtained, and calculate the absorption capacity of the polymer for pure water by the following equation:

$$\text{Water absorption capacity (g/g)} = \frac{\text{Weight of swollen gel (g)}}{\text{Weight of charged polymer (g)}}$$

(2) Physiological saline solution absorption:

Accurately weigh approximately 0.5 g of a highly water absorptive polymer. Place the polymer in a 250 mesh nylon sack (size: 20 cm × 10 cm) and immerse the nylon sack in 500 cc of a 0.9% physiological saline solution for one hour. Withdraw the nylon sack containing the swollen polymer from the solution, allow it to stand for 15 minutes for draining, and weigh it. Calculate the absorption capacity of the polymer for physiological saline solution by the equation shown in the above (1) by making a blank correction.

(3) Artificial urine absorption:

Accurately weigh approximately 0.5 g of a highly water absorptive polymer. Place the polymer in a 250-mesh nylon sack (size: 20 cm × 10 cm) and immerse the nylon sack in 500 cc of artificial urine for one hour. Withdraw the nylon sack containing the swollen polymer from the artificial urine, allow it to stand for 15 minutes for draining, and weigh it. Calculate the absorption capacity of the polymer for artificial urine by the equation shown in the above (1) by making a blank correction.

<Gel Strength>

Get 0.5 g of a highly water absorptive polymer swollen with 100 g of pure water (200 times absorption) to obtain a gel. Measure the strength at the time when a cell gets in the gel by a rheometer ("NMR-2002J" manufactured by Fudo Kogyo K. K.) to determine the gel strength of the polymer.

<Water Absorption Rate>

An apparatus used for determining the water absorption rate of highly water absorptive polymer is shown in FIG. 1, in which reference numeral 1 denotes a highly water absorptive polymer, reference numeral 2 denotes a supporting plate having a small hole at its center, reference numeral 3 denotes a non-woven cloth, reference numeral 4 denotes artificial urine, reference numeral 5 denotes a burette, reference numeral 6 denotes a rubber stopper, reference numerals 7 and 8 denote valves, and reference numeral 9 denotes an air inlet.

Put 1 g of the highly water absorptive polymer 1 on the non-woven cloth 3 placed on the supporting plate 2 having a small hole. Bring the artificial urine 4 into contact with the polymer as shown in the figure. Weigh the amount of the artificial urine absorbed by the polymer over a period of 10 minutes to determine the water absorption rate of the polymer.

EXAMPLES 1 to 39

Highly water absorptive polymers according to the present invention were respectively prepared in accordance with the procedures of the following Production Examples A to O. In preparing the aqueous monomer solutions in the Examples were respectively used the metallic salts and, optionally, the crosslinking agents as shown in Table 1. The properties of the polymers produced were measured by the above described methods. The results obtained are shown in Table 3.

<Production Example A>

121 g of cyclohexane was placed in a 500-ml four-necked round-bottomed flask equipped with a stirrer, a reflux condenser, a thermometer and a nitrogen gas feed pipe. After 0.9 g of sorbitan monostearate was added to the cyclohexane and dissolved therein, nitrogen gas was blown into the mixture to expel dissolved oxygen.

Separately, 12.3 g of 95% sodium hydroxide dissolved in 79.65 g of water was added to 30 g of acrylic acid placed in a 300-ml conical beaker while externally cooling with ice, whereby 70% of the carboxyl groups in the acrylic acid were neutralized. In this case, the monomer concentration in the aqueous solution after the neutralization amounts to 30% by weight. Subsequently, a crosslinking agent in a predetermined amount and 0.104 g of potassium persulfate were added to the monomer solution and dissolved therein. Nitrogen gas was then blown into the mixture to expel dissolved oxygen.

The content of the 300-ml conical beaker was added to the content of the 500-ml four-necked round-bottomed flask, and dispersed by stirring. The flask was heated on an oil bath to raise the internal temperature thereof while bubbling the mixture with nitrogen gas. When the internal temperature of the flask reached approximately 60° C., a rise in the temperature became drastic, and the temperature reached 75° C. within several tens of minutes. The internal temperature of the flask was then adjusted to 60° to 65° C., and the mixture was stirred for reaction by a stirrer set at 250 rpm for 3 hours while maintaining the internal temperature of the flask in the above range. When the stirring was stopped, wet polymer particles settled down on the bottom of the flask, so that they were easily separated from the cyclohexane phase by decantation. The wet polymer separated was transferred into a vacuum drier and heated to a temperature of 80° to 90° C. The cyclohexane and water were thus removed from the polymer particles, and 40 g of a dried powdery polymer was finally obtained.

<Production Example B>

121 g of cyclohexane was placed in a 500-ml four-necked round-bottomed flask equipped with a stirrer, a reflux condenser, a thermometer and a nitrogen gas feed pipe. After 0.9 g of sorbitan monostearate was added to the cyclohexane and dissolved therein, nitrogen gas was blown into the mixture to expel dissolved oxygen.

Separately, 12.3 g of 95% sodium hydroxide dissolved in 48.74 g of water was added to 30 g of acrylic acid placed in a 300-ml conical beaker while externally cooling with ice, whereby 70% of the carboxyl groups in the acrylic acid were neutralized. In this case, the monomer concentration in the aqueous solution after the neutralization amounts to 40% by weight. Subsequently, a crosslinking agent in a predetermined amount and 0.104 g of potassium persulfate were added to the monomer solution and dissolved therein. Nitrogen gas was then blown into the mixture to expel dissolved oxygen.

The content of the 300-ml conical beaker was added to the content of the 500-ml four-necked round-bottomed flask, and dispersed by stirring. The flask was heated on an oil bath to raise the internal temperature thereof while bubbling the mixture with nitrogen gas. When the internal temperature of the flask reached approximately 60° C., a rise in the temperature became drastic, and the temperature reached 75° C. within several tens of minutes. The internal temperature of the flask was then adjusted to 60° to 65° C., and the mixture was stirred for reaction by a stirrer set at 250 rpm for 3 hours while maintaining the internal temperature of the flask in the above range. When the stirring was stopped, wet polymer particles settled down on the bottom of the flask, so that they were easily separated from the cyclohexane phase by decantation. The wet polymer separated was transferred into a vacuum drier and heated to a temperature of 80° to 90° C. The cyclohexane and water were thus removed from the polymer particles, and 40 g of a dried powdery polymer was finally obtained.

<Production Example C>

To 30 g of acrylic acid placed in a 100-ml flask was added dropwise 58.7 g of a 22.6 wt. % aqueous sodium hydroxide solution while stirring and ice-cooling, thereby neutralizing 80% of the acrylic acid. Subsequently, 0.1 g of potassium persulfate was added to the mixture and dissolved therein at room temperature while stirring.

Separately, 163.4 g of cyclohexane and 1.9 g of sorbitan monolaurate were placed in a 500-ml flask equipped with a reflux condenser and previously purged with nitrogen gas. The mixture was stirred at room temperature to thoroughly dissolve the sorbitan monolaurate (surfactant) in the cyclohexane. To the resulting solution, the content of the 100-ml flask was added dropwise to form a suspension. The 500-ml flask was thoroughly purged again with nitrogen gas, and then heated on an oil bath. The reaction was carried out for 3 hours while keeping the temperature of the oil bath at 55° to 60° C. The resulting reaction mixture was dried by evaporation under reduced pressure, whereby a dried fine granular polymer was finally obtained.

<Production Example D>

228 ml of n-hexane was placed in a 500-ml four-necked round-bottomed flask equipped with a stirrer, a reflux condenser, a thermometer and a nitrogen gas feed pipe. After 1.8 g of sorbitan monostearate was added to the n-hexane and dissolved therein, nitrogen gas was blown into the mixture to expel dissolved oxygen.

Separately, 13.1 g of 95% sodium hydroxide dissolved in 39 g of water was added to 30 g of acrylic acid placed in a 300-ml conical beaker while externally cooling with ice, whereby 70% of the carboxyl groups in the acrylic acid were neutralized. In this case, the monomer concentration in the aqueous solution was 45% by weight. Subsequently, 0.1 g of potassium persulfate was added to the monomer solution and dissolved therein. Nitrogen gas was then blown into the mixture to expel dissolved oxygen.

The content of the 300-ml conical beaker was added to the content of the 500-ml four-necked round-bottomed flask, and dispersed therein by stirring. Reaction was conducted for 6 hours while maintaining the internal temperature of the flask at 60° to 65° C. on an oil bath and gradually introducing nitrogen gas into the flask.

After the reaction was completed, wet polymer particles settled down on the bottom of the flask when the stirring was stopped. The n-hexane was distilled off under reduced pressure, and the remaining wet polymer was dried at a temperature of 80° to 90° C. under reduced pressure, whereby 40 g of a dried powdery polymer was finally obtained.

<Production Example E>

100 g of a 43% aqueous acrylic acid salt monomer solution consisting of acrylic acid with 75% of carboxyl groups neutralized to sodium salts and a crosslinking agent in a predetermined amount was statically polymerized in the presence of 0.015 g of ammonium persulfate and 0.005 g of sodium hydrogen sulfite at a temperature of 65° C. in a nitrogen atmosphere. The gelled polymer containing water thus obtained was dried at a temperature of 110° C. under reduced pressure, and then pulverized by a mixer-type pulverizer, whereby a powdery polymer was finally obtained.

<Production Example F>

30 g of acrylic acid was added to 9.24 g of deionized water. To this mixture, 20.6 g of 85% potassium hydroxide serving as a neutralizing agent and a crosslinking agent in a predetermined amount were added in this order, thereby preparing a 70 wt. % aqueous potassium acrylate solution (degree of neutralization: 75%).

To the above solution which was maintained at a temperature of 70° C. was added a solution prepared by dissolving 0.208 g of 2,2'-azobis(2-amidinopropane)-dihydrochloride in 1.0 g of water. Immediately after the addition, the mixture was poured into a cylindrical reactor with an inner diameter of about 10 cm, which had been heated to a temperature of 70° C. in advance, and was spread over the bottom surface of the reactor. After several seconds, polymerization was initiated, and the reaction was completed within about one minute. A dried polymer foamed by the polymerization heat was thus obtained. This polymer was subjected to pulverization to give a powdery polymer.

<Production Example G>

121 g of cyclohexane was placed in a 500-ml four-necked round-bottomed flask equipped with a stirrer, a reflux condenser, a thermometer and a nitrogen gas feed pipe. After 0.9 g of sorbitan monostearate was added to the cyclohexane and dissolved therein, nitrogen gas was blown into the mixture to expel dissolved oxygen.

Separately, 70.02 g of 25% sodium hydroxide dissolved in 6.4 g of water was added to 45 g of acrylic acid placed in a 300-ml conical beaker while externally cooling with ice, whereby 70% of the carboxyl groups in the acrylic acid were neutralized. In this case, the monomer concentration in the aqueous solution after the neutralization amounts to 45% by weight. Subsequently, a crosslinking agent in a predetermined amount and 0.032 g of potassium persulfate were added to the monomer solution and dissolved therein. Nitrogen gas was then blown into the mixture to expel dissolved oxygen.

The content of the 300-ml conical beaker was added to the content of the 500-ml four-necked round-bottomed flask, and dispersed by stirring. The flask was heated on an oil bath to raise the internal temperature thereof while bubbling the mixture with nitrogen gas. When the internal temperature of the flask reached approximately 60° C., a rise in the temperature became drastic, and the temperature reached 75° C. within several tens minutes. The internal temperature of the flask was then adjusted to 60° to 65° C. and the mixture was stirred for reaction by a stirrer set at 250 rpm for 3 hours while maintaining the internal temperature of the flask in the above range. When the stirring was stopped, wet polymer particles settled down on the bottom of the flask, so that they were easily separated from the cyclohexane phase by decantation. The wet polymer separated was transferred into a vacuum drier and heated to a temperature of 80° to 90° C. The cyclohexane and water were thus removed from the polymer particles, and 40 g of a dried powdery polymer was finally obtained.

<Production Example H>

121 g of cyclohexane was placed in a 500-ml four-necked round-bottomed flask equipped with a stirrer, a reflux condenser, a thermometer and a nitrogen gas feed pipe. After 0.9 g of sorbitan monostearate was added to the cyclohexane and dissolved therein, nitrogen gas was blown into the mixture to expel dissolved oxygen.

Separately, 70.02 g of 25% sodium hydroxide dissolved in 6.4 g of water was added to 45 g of acrylic acid placed in a 300-ml conical beaker while externally cooling with ice, whereby 70% of the carboxyl groups in the acrylic acid were neutralized. In this case, the monomer concentration in the aqueous solution after the neutralization amounts to 45% by weight. Subsequently, a crosslinking agent in a predetermined amount and 0.05 g of potassium persulfate were added to the monomer solution and dissolved therein. Nitrogen gas was then blown into the mixture to expel dissolved oxygen.

The content of the 300-ml conical beaker was added to the content of the 500-ml four-necked round-bottomed flask, and dispersed by stirring. The flask was heated on an oil bath to raise the internal temperature thereof while bubbling the mixture with nitrogen gas. When the internal temperature of the flask reached approximately 60° C., a rise in the temperature became drastic, and the temperature reached 75° C. within several tens minutes. The internal temperature of the flask was then adjusted to 60° to 65° C., and the mixture was stirred for reaction by a stirrer set at 250 rpm for 3 hours while maintaining the internal temperature of the flask in the above range.

Subsequently, the temperature of the oil bath was raised to dehydrate the polymer solution through azeotropy of water and cyclohexane, whereby the water content of the polymer was adjusted to 25% by weight. After adjusting the internal temperature of the flask to 60° C., 0.12 g of γ-glycidoxypropyltrimethoxysilane as the silane compound and 0.273 g of dibutyltin dilaurate as the silanol catalyst were respectively added to the polymer while stirring, and the treatment of the polymer surface was carried out at a temperature of 60° C. for one hour. Thereafter, the temperature of the oil bath was raised to 105° C. to vaporize the cyclohexane and water. The modification of the polymer surface was thus completed.

The thus modified polymer was washed with 150 g of fresh cyclohexane at a temperature of 60° C., and then dried in a vacuum drier at a temperature of 80° to 90° C., whereby a dried highly water absorptive polymer was finally obtained.

<Production Examples I to O>

The surfaces of the highly water absorptive polymers obtained in Production Examples A to G were respectively modified with a silane compound in the following manner:

10 g of water was poured into a 300 cc flask containing 40 g of the polymer so as to get the polymer swollen with the water. To the swollen polymer thus obtained was added 50 g of cyclohexane, 0.088 g of γ-glycidoxypropyltrimethoxysilane as the silane compound and 0.2 g of dibutyltin dilaurate as the silanol catalyst, and surface treatment of the polymer was effected on an oil bath at a temperature of 60° C. for one hour. Subsequently, the temperature of the oil bath was raised to 105° C. to vaporize the cyclohexane and water. The modification of the polymer surface was thus completed.

The thus modified polymer was washed with 110 g of fresh cyclohexane having a temperature of 60° C., and then dried in a vacuum drier at a temperature of 80° to 90° C., whereby a dried powdery polymer was finally obtained.

Comparative Examples 1 to 16

Comparative highly absorptive polymers were respectively prepared in accordance with the procedures of Production Examples A to O, provided that no metallic salt was used (see Table 2). The properties of the polymers obtained are shown in Table 4.

TABLE 1

| | Production Example | Metallic Salt | | Crosslinking Agent | |
|---|---|---|---|---|---|
| | | Type | Amount Used (wt. % based on monomer) | Type | Amount Used (wt. % based on monomer) |
| Example 1 | A | Hexahydrate of iron(III) chloride | 0.0219 | MBA | 0.114 |
| Example 2 | A | " | 0.0219 | MBA | 0.057 |
| Example 3 | A | n-Hydrate of iron(II) chloride | 0.0219 | MBA | 0.114 |
| Example 4 | B | Hexahydrate of iron(III) chloride | 0.0219 | MBA | 0.038 |

TABLE 1-continued

| | Produc-tion Example | Metallic Salt | | Crosslinking Agent* | |
|---|---|---|---|---|---|
| | | Type | Amount Used (wt. % based on monomer) | Type | Amount Used (wt. % based on monomer) |
| Example 5 | B | " | 0.0440 | MBA | 0.038 |
| Example 6 | C | Hexahydrate of iron(III) chloride | 0.0110 | — | — |
| Example 7 | C | " | 0.0219 | — | — |
| Example 8 | D | Hexahydrate of iron(III) chloride | 0.0219 | — | — |
| Example 9 | D | " | 0.0440 | — | — |
| Example 10 | E | Hexahydrate of iron(III) chloride | 0.0219 | MBA | 0.038 |
| Example 11 | E | " | 0.0219 | A-600 | 0.084 |
| Example 12 | F | Hexahydrate of iron(III) chloride | 0.0219 | MBA | 0.228 |
| Example 13 | F | " | 0.0219 | MBA | 0.114 |
| Example 14 | F | " | 0.0219 | MBA | 0.057 |
| Example 15 | G | Hexahydrate of iron(III) chloride | 0.0058 | MBA | 0.014 |
| Example 16 | G | " | 0.0058 | MBA | 0.018 |
| Example 17 | G | " | 0.0146 | MBA | 0.018 |
| Example 18 | G | " | 0.0293 | MBA | 0.050 |
| Example 19 | G | n-Hydrate of iron(II) chloride | 0.0108 | MBA | 0.014 |
| Example 20 | G | n-Hydrate of iron(III) sulfate | 0.0055 | MBA | 0.014 |
| Example 21 | G | n-Hydrate of iron(III) phosphate | 0.0146 | MBA | 0.014 |
| Example 22 | G | Monohydrate of copper(II) acetate | 0.0018 | MBA | 0.038 |
| Example 23 | G | Tetrahydrate of manganese(II) chloride | 0.0108 | MBA | 0.014 |
| Example 24 | G | n-Hydrate of vanadyl(II) sulfate | 0.0055 | MBA | 0.014 |
| Example 25 | G | Hexahydrate of cobalt(II) chloride | 0.0330 | MBA | 0.014 |
| Example 26 | G | Nickel(II) chloride | 0.0360 | MBA | 0.014 |
| Example 27 | G | Hexahydrate of iron(III) chloride | 0.0058 | A-600 | 0.040 |
| Example 28 | H | Hexahydrate of iron(III) chloride | 0.0058 | MBA | 0.018 |
| Example 29 | I | Hexahydrate of iron(III) chloride | 0.0219 | MBA | 0.114 |
| Example 30 | J | Hexahydrate of iron(III) chloride | 0.0219 | MBA | 0.038 |
| Example 31 | K | Hexahydrate of iron(III) chloride | 0.0219 | — | — |
| Example 32 | L | Hexahydrate of iron(III) chloride | 0.0219 | — | — |
| Example 33 | M | Hexahydrate of iron(III) chloride | 0.0219 | MBA | 0.038 |
| Example 34 | N | Hexahydrate of iron(III) chloride | 0.0219 | MBA | 0.114 |
| Example 35 | O | Hexahydrate of iron(III) chloride | 0.0058 | MBA | 0.018 |
| Example 36 | O | n-Hydrate of iron(III) sulfate | 0.0055 | MBA | 0.014 |
| Example 37 | O | n-Hydrate of iron(III) phosphate | 0.0146 | MBA | 0.014 |
| Example 38 | O | Monohydrate of copper(II) acetate | 0.0018 | MBA | 0.038 |
| Example 39 | O | n-Hydrate of vanadyl(II) sulfate | 0.0055 | MBA | 0.014 |

*MBA: N,N'-methylenebisacrylamide
A-600: polyethylene glycol diacrylate (n = 14)

TABLE 2

| | Production Example | Crosslinking Agent | |
|---|---|---|---|
| | | Type | Amount used (wt. % based on monomer) |
| Comparative Example 1 | A | MBA | 0.114 |
| Comparative Example 2 | B | MBA | 0.038 |
| Comparative Example 3 | C | — | — |
| Comparative Example 4 | D | — | — |
| Comparative Example 5 | E | MBA | 0.038 |
| Comparative Example 6 | F | MBA | 0.114 |
| Comparative Example 7 | G | MBA | 0.114 |
| Comparative Example 8 | G | MBA | 0.038 |
| Comparative Example 9 | H | MBA | 0.018 |
| Comparative Example 10 | I | MBA | 0.114 |
| Comparative Example 11 | J | MBA | 0.038 |
| Comparative Example 12 | K | — | — |
| Comparative Example 13 | L | — | — |
| Comparative Example 14 | M | MBA | 0.038 |
| Comparative Example 15 | N | MBA | 0.114 |
| Comparative Example 16 | O | MBA | 0.014 |

TABLE 3

| Example | Water Absorption Capacity (g/g) | | | Gel Strength (g/cm$^2$) | Water Absorption Rate (g/g) |
|---|---|---|---|---|---|
| | Pure Water | Physiological Saline Solution | Artificial Urine | | |
| 1 | 842 | 70.5 | 51.6 | 3.2 | 11.5 |
| 2 | 1058 | 85.1 | 65.0 | 1.5 | 8.2 |
| 3 | 754 | 68.8 | 45.9 | 3.1 | 9.8 |
| 4 | 891 | 72.7 | 53.1 | 2.6 | 10.5 |
| 5 | 1088 | 81.5 | 63.2 | 1.8 | 8.1 |
| 6 | 894 | 71.3 | 51.5 | 2.8 | 8.8 |
| 7 | 995 | 78.9 | 59.5 | 2.1 | 7.6 |
| 8 | 803 | 70.2 | 49.9 | 1.9 | 9.5 |
| 9 | 1001 | 80.1 | 63.3 | 2.1 | 11.2 |

TABLE 3-continued

| Example | Water Absorption Capacity (g/g) | | | Gel Strength (g/cm²) | Water Absorption Rate (g/g) |
| --- | --- | --- | --- | --- | --- |
| | Pure Water | Physiological Saline Solution | Artificial Urine | | |
| 10 | 789 | 68.1 | 48.2 | 2.9 | 10.5 |
| 11 | 742 | 66.5 | 45.3 | 2.5 | 9.4 |
| 12 | 915 | 61.3 | 52.5 | 2.1 | 8.9 |
| 13 | 1021 | 63.3 | 55.5 | 1.8 | 8.5 |
| 14 | 1152 | 65.2 | 57.8 | 1.5 | 7.2 |
| 15 | 1251 | 90.5 | 72.0 | 1.5 | 7.5 |
| 16 | 1054 | 85.2 | 56.0 | 1.6 | 8.1 |
| 17 | 1282 | 89.9 | 68.2 | 1.3 | 6.5 |
| 18 | 1152 | 81.6 | 61.2 | 1.5 | 7.8 |
| 19 | 891 | 71.5 | 49.5 | 1.2 | 6.8 |
| 20 | 1129 | 82.1 | 56.0 | 1.5 | 9.2 |
| 21 | 1005 | 81.1 | 52.0 | 1.3 | 7.2 |
| 22 | 927 | 80.5 | 51.0 | 1.2 | 8.5 |
| 23 | 795 | 61.2 | 45.0 | 3.1 | 9.8 |
| 24 | 1015 | 80.9 | 56.0 | 1.2 | 8.5 |
| 25 | 747 | 59.5 | 42.0 | 4.5 | 10.2 |
| 26 | 723 | 58.2 | 43.0 | 3.6 | 9.8 |
| 27 | 988 | 79.9 | 55.1 | 1.8 | 7.7 |
| 28 | 894 | 76.2 | 52.0 | 8.9 | 35.6 |
| 29 | 792 | 65.1 | 50.5 | 9.2 | 41.5 |
| 30 | 791 | 63.2 | 48.5 | 11.3 | 42.3 |
| 31 | 789 | 61.3 | 45.5 | 10.5 | 40.8 |
| 32 | 755 | 65.1 | 45.3 | 11.2 | 39.8 |
| 33 | 650 | 60.2 | 45.5 | 13.1 | 41.2 |
| 34 | 895 | 57.5 | 50.5 | 10.2 | 43.2 |
| 35 | 921 | 65.8 | 51.2 | 9.9 | 45.2 |
| 36 | 1021 | 67.2 | 53.2 | 8.9 | 40.8 |
| 37 | 895 | 77.2 | 51.0 | 7.9 | 40.5 |
| 38 | 855 | 72.1 | 48.6 | 9.5 | 41.5 |
| 39 | 981 | 75.5 | 51.2 | 10.3 | 43.2 |

TABLE 4

| Comparative Example | Water Absorption Capacity (g/g) | | | Gel Strength (g/cm²) | Water Absorption Rate (g/g) |
| --- | --- | --- | --- | --- | --- |
| | Pure Water | Physiological Saline Solution | Artificial Urine | | |
| 1 | 623 | 47.1 | 38.2 | 3.8 | 8.6 |
| 2 | 592 | 48.2 | 39.5 | 3.2 | 7.1 |
| 3 | 452 | 38.2 | 25.8 | 4.2 | 10.1 |
| 4 | 415 | 37.5 | 23.3 | 3.8 | 11.2 |
| 5 | 582 | 47.2 | 35.1 | 3.3 | 13.2 |
| 6 | 685 | 50.2 | 40.2 | 2.9 | 12.2 |
| 7 | 895 | 63.2 | 48.0 | 3.2 | 8.5 |
| 8 | 581 | 42.1 | 35.0 | 4.5 | 13.2 |
| 9 | 601 | 49.1 | 38.0 | 8.9 | 32.3 |
| 10 | 584 | 44.2 | 33.2 | 9.1 | 28.8 |
| 11 | 495 | 45.1 | 33.2 | 8.9 | 25.5 |
| 12 | 432 | 35.1 | 22.3 | 5.5 | 22.9 |
| 13 | 382 | 35.6 | 21.2 | 8.9 | 23.3 |
| 14 | 554 | 42.2 | 33.3 | 7.9 | 25.1 |
| 15 | 651 | 45.8 | 35.1 | 10.2 | 30.5 |
| 16 | 795 | 53.1 | 41.2 | 11.2 | 32.5 |

What is claimed is:

1. A process for producing a water-insoluble highly water absorptive polymer, comprising the step of:
polymerizing an acrylic monomer comprising as the main component acrylic acid and/or an alkali metal salt thereof, and a crosslinking monomer, in the presence of a salt of a metal selected from the group consisting of Fe(II), Fe(III), Cu(II), Mn(II), VO(II), Co(II) and Ni(II), wherein the amount of said salt of a metal is 0.001 to 1% by weight based on the acrylic monomer.

2. The process according to claim 1, wherein the crosslinking monomer is selected from the group consisting of N,N'-methylenebisacrylamide, N,N'-methylenebismethacrylamide, ethylene glycol di(meth)acrylate and polyethylene glycol di(meth)acrylate.

3. The process according to claim 1, wherein said salt of a metal is an oxychloride.

4. The process according to claim 1, wherein the salt of the metal is an iron(III) salt, a copper(II) salt or a vanadyl(I) salt.

* * * * *